(12) United States Patent
Liu et al.

(10) Patent No.: US 10,928,930 B2
(45) Date of Patent: Feb. 23, 2021

(54) TRANSPARENT DISPLAY DEVICE AND CONTROL METHOD USING THE SAME

(71) Applicants: Industrial Technology Research Institute, Hsinchu (TW); Intellectual Property Innovation Corporation, Hsinchu (TW)

(72) Inventors: Te-Chih Liu, Taoyuan (TW); Chih-Chia Chang, Hsinchu County (TW); Yu-Hsin Lin, Miaoli County (TW); Yi-Chuan Lu, Kinmen County (TW)

(73) Assignees: Industrial Technology Research Institute, Hsinchu (TW); Intellectual Property Innovation Corporation, Hsinchu (TW)

( * ) Notice: Subject to any disclaimer, the term of this patent is extended or adjusted under 35 U.S.C. 154(b) by 17 days.

(21) Appl. No.: 15/997,712

(22) Filed: Jun. 5, 2018

(65) Prior Publication Data

US 2019/0050071 A1 Feb. 14, 2019

Related U.S. Application Data

(60) Provisional application No. 62/544,923, filed on Aug. 14, 2017.

(30) Foreign Application Priority Data

Dec. 13, 2017 (TW) .............................. 106143783 A (51) Int. Cl.
*G06F 3/0346* (2013.01)
*G06F 3/00* (2006.01)
(Continued)

(52) U.S. Cl.
CPC ............ *G06F 3/0346* (2013.01); *G06F 3/005* (2013.01); *G06F 3/012* (2013.01); *G06F 3/017* (2013.01);
(Continued)

(58) Field of Classification Search
None
See application file for complete search history.

(56) References Cited

U.S. PATENT DOCUMENTS 8,466,894 B2 6/2013 Sugita et al.
9,558,590 B2 1/2017 Westerinen et al.
(Continued)

FOREIGN PATENT DOCUMENTS

CN 201748927 2/2011
CN 102682742 9/2012
(Continued)

OTHER PUBLICATIONS

Office Action of Taiwan Counterpart Application, dated Sep. 25, 2018, pp. 1-8.
(Continued)

*Primary Examiner* — Krishna P Neupane
(74) *Attorney, Agent, or Firm* — JCIPRNET (57) ABSTRACT

A transparent display device and a control method using the same are provided. The transparent display device includes a transparent display, a plurality of identification sensors, a scene sensor, and a controller. The identification sensors are configured to sense a user located at a first side of the transparent display to generate a plurality of identification data. The scene sensor is configured to sense scene information located at a second side. The controller obtains a user distance between the user and the transparent display, selects corresponding identification data generated by at least one of or multiple of the identification sensors according to the user
(Continued)

distance, determines a location and a gaze direction of the user and a target object in the scene information according to the selected corresponding identification data, and presents target object information corresponding to the target object in the transparent display.

18 Claims, 5 Drawing Sheets

(51) Int. Cl.
*G06F 3/01* (2006.01)
*G06F 3/03* (2006.01)
*G06K 9/00* (2006.01)
*G09G 3/20* (2006.01)
*G09G 5/00* (2006.01)

(52) U.S. Cl.
CPC ......... *G06F 3/0304* (2013.01); *G06K 9/0061* (2013.01); *G06K 9/00671* (2013.01); *G09G 3/20* (2013.01); *G09G 3/2092* (2013.01); *G09G 5/00* (2013.01); *G09G 2354/00* (2013.01); *G09G 2360/144* (2013.01); *G09G 2380/00* (2013.01)

(56) References Cited

U.S. PATENT DOCUMENTS

| | | | |
|---|---|---|---|
| 9,619,105 | B1 | 4/2017 | Dal Mutto |
| 2011/0074822 | A1 | 3/2011 | Chang |
| 2012/0026108 | A1* | 2/2012 | Sugita .................. G06F 3/005 345/173 |
| 2012/0176303 | A1 | 7/2012 | Miyake |
| 2013/0265232 | A1* | 10/2013 | Yun ....................... G09G 3/3208 345/158 |
| 2014/0098088 | A1* | 4/2014 | Ryu ....................... G06T 19/006 345/419 |
| 2015/0045065 | A1* | 2/2015 | Shin ..................... G06Q 10/047 455/456.3 |
| 2015/0154801 | A1* | 6/2015 | Lee ......................... G06T 11/00 345/589 |
| 2015/0339023 | A1 | 11/2015 | Park et al. |
| 2016/0314624 | A1 | 10/2016 | Li et al. |
| 2016/0321843 | A1 | 11/2016 | Kasahara et al. |
| 2017/0019595 | A1 | 1/2017 | Chen et al. |
| 2017/0140577 | A1 | 5/2017 | Westerinen et al. |

FOREIGN PATENT DOCUMENTS

| | | |
|---|---|---|
| CN | 102868897 | 1/2013 |
| CN | 104627078 | 5/2015 |
| CN | 104704444 | 6/2015 |
| CN | 104807855 | 7/2015 |
| CN | 105593787 | 5/2016 |
| CN | 106055218 | 10/2016 |
| TW | 201333753 | 8/2013 |
| TW | 201400865 | 1/2014 |
| TW | 201546657 | 12/2015 |
| TW | 201606352 | 2/2016 |
| TW | 201619760 | 6/2016 |
| TW | 201633256 | 9/2016 |

OTHER PUBLICATIONS

"Office Action of Taiwan Related Application No. 106138750", dated Nov. 19, 2018, pp. 1-15.

* cited by examiner

TRANSPARENT DISPLAY DEVICE AND CONTROL METHOD USING THE SAME

CROSS-REFERENCE TO RELATED APPLICATION

This application claims the priority benefits of U.S. provisional application Ser. No. 62/544,923, filed on Aug. 14, 2017 and Taiwan application serial no. 106143783, filed on Dec. 13, 2017. The entirety of each of the above-mentioned patent applications is hereby incorporated by reference herein and made a part of this specification.

TECHNICAL FIELD

The disclosure relates to a transparent display device and a control method using the same.

BACKGROUND

Vendors or contractors running a scenery location often provide tourists with message sources through message boards, voice guides, etc. The tourists may thus have a better understanding of the scene objects (e.g., famous buildings, attractions, marine life, or cultural relics). Nevertheless, a user can not interact with a message board, and the message board may not instantly provide related information on a scene object in the line of sight of the user.

Although a variety of display displaying technologies and personnel detection technologies are available, these technologies have their own limits. For instance, a commercially available human eye tracking technology cannot work normally if an overly close distance is provided between the person to be detected and cannot work normally either when a number of people are presented to be detected simultaneously. The touch sensing technology may work only when a user touches or is very close to a touch panel. A certain distance is also required by the spatial body identification technology using cameras to capture images and identify actions of people for providing better precision, and other technological defects may also be found.

Therefore, how the display technology of the augmented reality (AR) to be introduced to be applied to the guiding and narration of the scene object and how the actions of the user be detected with improved precision are important issues to be overcome.

SUMMARY

An embodiment of the disclosure provides a transparent display device including a transparent display, a plurality of identification sensors, a scene sensor, and a controller. The transparent display includes a first side and a second side opposite to the first side. A display screen of the transparent display is visually penetrative. The identification sensors are configured to sense at least one user located at the first side to respectively generate a plurality of identification data. The identification sensors respectively have different identifying distances. The scene sensor is configured to sense scene information located at the second side. The controller is coupled to the identification sensors, the scene sensor, and the transparent display. The controller obtains a user distance between the at least one user and the transparent display by controlling one of the identification sensors, selects corresponding identification data generated by at least one of or multiple of the identification sensors according to the user distance, determines a location and a gaze direction of the at least one user and a target object in the scene information according to the selected corresponding identification data, and presents target object information corresponding to the target object in the transparent display.

An embodiment of the disclosure further provides a control method using a transparent display device. The transparent display device includes a transparent display, a plurality of identification sensors, and a scene sensor. The control method includes following steps. A user distance between a user and the transparent display is obtained through one of the identification sensors. Corresponding identification data generated by at least one of or multiple of the identification sensors is selected according to the user distance. A location and a gaze direction of the user and a target object in a scene information sensed by the scene sensor are determined according to the selected corresponding identification data. Moreover, target object information corresponding to the target object is presented in the transparent display.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
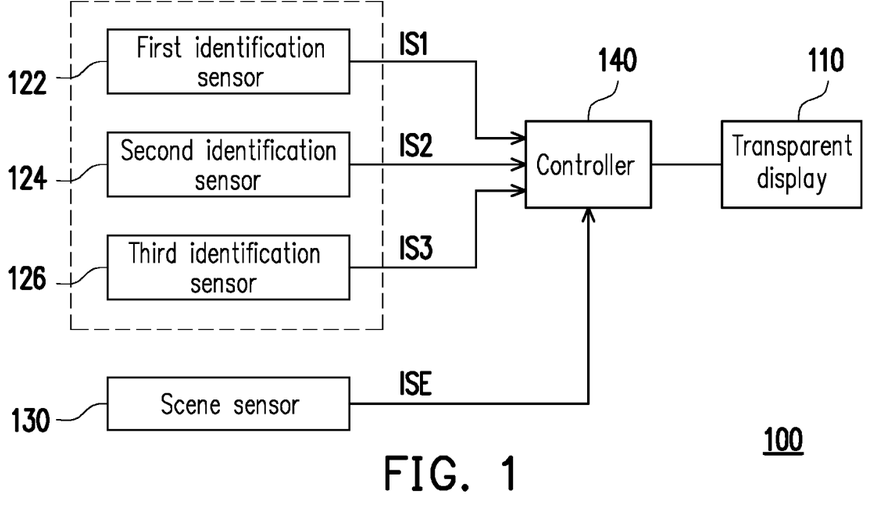
FIG. 1 is a block view of functions of a transparent display device according to an exemplary embodiment of the disclosure.
Figure 2:
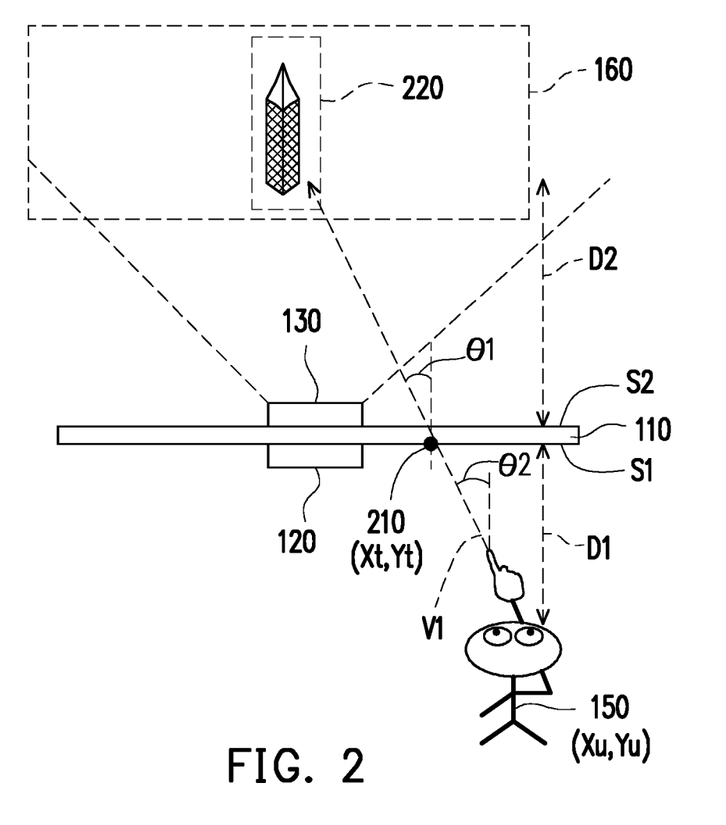
FIG. 2 is a schematic view of a transparent display device according to an exemplary embodiment of the disclosure.

FIG. 1 is a block view of functions of a transparent display device 100 according to an exemplary embodiment of the disclosure. FIG. 2 is a schematic view of the transparent display device 100 according to an exemplary embodiment of the disclosure. The transparent display device 100 includes a transparent display 110, a plurality of identification sensor (e.g., a first identification sensor 122, a second identification sensor 124, and a third identification sensor 126 in FIG. 1), a scene sensor 130, and a controller 140. For ease of description, the first identification sensor 122, the second identification sensor 124, and the third identification sensor 126 are referred to as a user sensor group 120. The first identification sensor 122, the second identification sensor 124, and the third identification sensor 126 respectively generate corresponding identification data IS1, identification data IS2, and identification data IS3.

The transparent display 110 refers to a display with a display screen exhibiting a certain level of light penetration and thus may present a background behind a panel. That is, the display screen of the transparent display 110 is visually penetrative. The transparent display 110 of this embodiment may be applied to various applications such as windows in a building (e.g., an observation deck, an aquarium, a museum), a display window, glass and a display of a vehicle or a cable car, and the like. The transparent display 110 of this embodiment has a first side S1 facing at least one user 150 and a second side S2 facing scene information 160. That is, the first side S1 and the second side S2 of the transparent display 110 are opposite to each other.

The user sensor group 120 in FIG. 2 of this embodiment is disposed at an outside of a main body of the transparent display 110 and the first side S1 facing the user, is located at a midline position of the transparent display 110, and is located above the main body of the transparent display 110. The scene sensor 130 is disposed at the outside of the main body of the transparent display 110 and the second side S2 facing external scenery, located at the midline position of the transparent display 110, and is located above the main body of the transparent display 110. The user sensor group 120 and the scene sensor 130 may further be disposed in the main body of the transparent display 110. The user sensor group 120 and the scene sensor 130 may also be disposed at a position rather than the midline position and close to a left side of the transparent display 110 or close to a right side of the transparent display 110. Alternatively, the first sensor group 120 and the scene sensor 130 may be designed to disposed at other positions away from the main body of the transparent display 110. For instance, a height at which the first sensor group 120 is disposed may be lowered to a height of a common user. That is, the disclosure is not intended to limit the positions at which the user sensor group 120 and the scene sensor 130 are disposed. As long as the user sensor group 120 can sense the user 150 located at the first side S1 of the transparent display 110, and the scene sensor 130 can sense the scene information 160 located at the second side of the transparent display 110.

The user sensor group 120 has a plurality of identification sensors, for example, the first identification sensor 122, the second identification sensor 124, and the third identification sensor 126. The identification sensors 122, 124, and 126 may be respectively disposed at different positions of the transparent display 110, and the identification sensors 122, 124, and 126 respectively have identifying distances. For instance, the first identification sensor 122 of this embodiment may be a depth sensor. Body movements of the user 150 may be obtained by the first identification sensor 122 to act as a characteristic of the user 150. An identifying distance of the depth sensor relative to the user ranges between approximately 50 cm and 100 cm. The second identification sensor 124 may be a face sensor. Subtle movements of the face, eyeballs, fingers, or body of the user 150 may be obtained by the second identification sensor 124 to act as a characteristic of the user 150. An identifying distance of the face sensor relative to the user ranges between approximately 40 cm and 60 cm. The first identification sensor 122 and the second identification sensor 124 may thereby be disposed at the midline position located at the first side S1 of the transparent display 110. The third identification sensor 126 of this embodiment may be a touch sensor, a sensing equipment of the third identification sensor 126 is located at the first side S1 of the transparent display 110. An identifying distance of the touch sensor relative to the user ranges between approximately 0 cm and 40 cm. In other words, the positions of the first identification sensor 122 and the second identification sensor 124 may different from a position of the third identification sensor 126. The identifying distance of the depth sensor (the first identification sensor 122) is greater than the identifying distance of the face sensor (the second identification sensor 124), and the identifying distance of the face sensor (the second identification sensor 124) is greater than the identifying distance of the touch sensor (the third identification sensor 126).

The first identification sensor 122 of this embodiment may be implemented through a human skeleton analysis technology, a gesture detection technology, a stereo camera recognition technology, and a corresponding hardware; the second identification sensor 124 of this embodiment may be implemented through an eye tracking technology, a stereo vision sensing technology, a stereo camera recognition technology, and a corresponding hardware; the third identification sensor 126 of this embodiment may be implemented through a capacitive or resistive touch technology and a corresponding hardware.

For ease of explanation, coordinates of the user is presented as $(X_u, Y_u)$; a gaze direction of the user 150 is marked as V1; coordinates of a first gaze point 210 extending from the gaze direction V1 to the transparent display 110 is presented as $(X_t, Y_t)$ located at the first side S1 of the transparent display 110; coordinates of a target object 220 in the scene information 160 is presented as $(X_v, Y_v)$. A distance between the user 150 and the transparent display 110 is presented as D1; A distance between the transparent display 110 and the target object 220 is presented as D2. Generally, the distance D1 ranges between 0 cm and 100 cm, and the distance D2 ranges between 65 cm and infinity.

The scene sensor 130 is configured to sense an external scene information ISE. The external scene information ISE includes the scene information 160 viewed by the user through the transparent display 110 and located at the second side S2 of the transparent display 110. The scene sensor 130 may use a plurality of image capturing equipment to obtain the scene information 160 and a depth information (e.g., the distance D2) of at least one target object (e.g., the target object 220) located in the scene information 160.

The controller 140 is coupled to the transparent display 110, the multiple identification sensors (e.g., the first identification sensor 122, the second identification sensor 124, and the third identification sensor 126), and the scene sensor 130. The controller 140 of this embodiment may be implemented as a hardware device such as a system on a chip (SOC), a field programmable gate array (FPGA) chip, a complex programmable logic device (CPLD), a microprocessor, etc. The controller 140 of this embodiment may further include a plurality of functional modules, as shown in FIG. 3.

Figure 3:
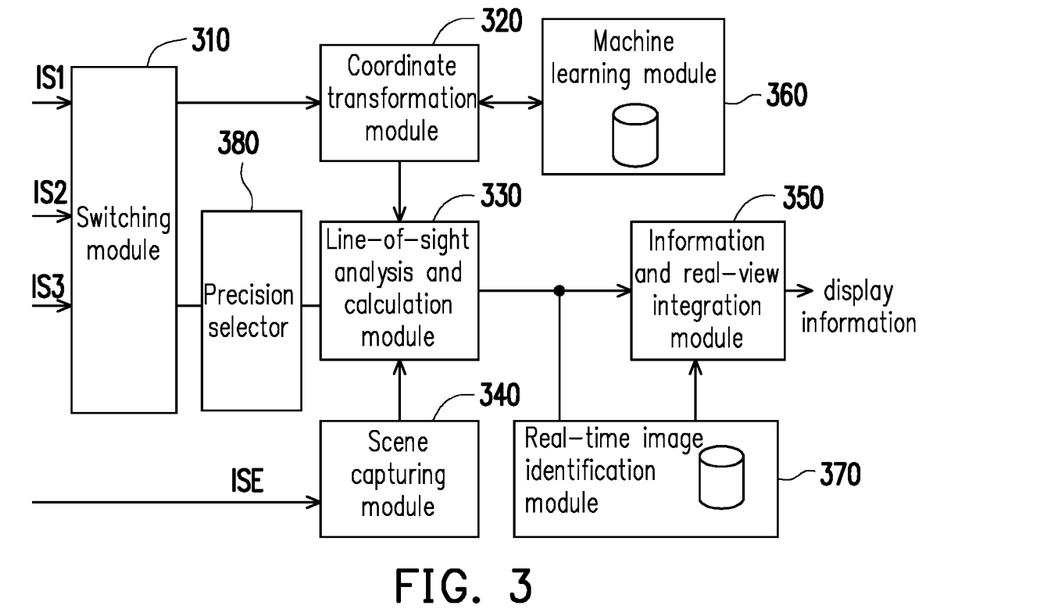
FIG. 3 is a schematic view of functional modules of a controller according to an exemplary embodiment of the disclosure.
Figure 4:
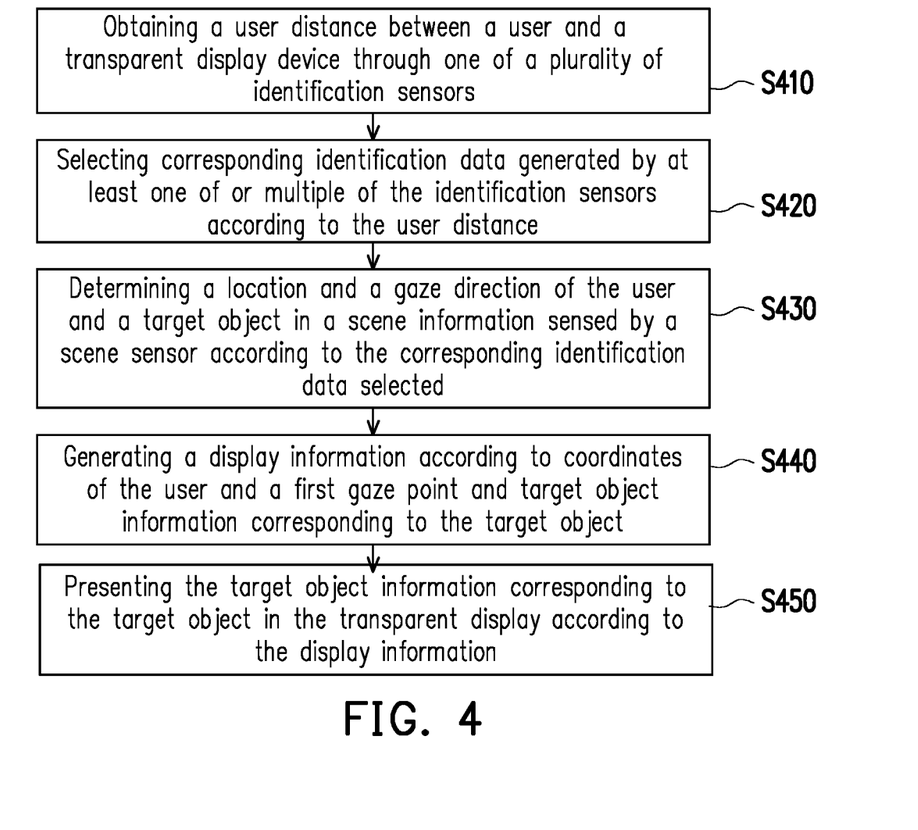
FIG. 4 is a flow chart of a control method of a transparent display device according to an exemplary embodiment of the disclosure.

FIG. 3 is a schematic view of the functional modules of the controller 130 according to an exemplary embodiment of the disclosure. FIG. 4 is a flow chart of a control method of a transparent display device according to an exemplary embodiment of the disclosure. Each of the functional modules in FIG. 3 and the corresponding step and process in FIG. 4 are correspondingly described. The controller 140 may include plural functional modules. The functional modules may be implemented by software together with the controller 140 and may also be implemented directly by forming the controller 140 through the function modules being equipped with hardware circuits having the same functions.

In FIG. 3, the controller 140 mainly includes a switching module 310, a coordinate transformation module 320, a line-of-sight analysis and calculation module 330, a scene capturing module 340, and an information and real-view integration module 350. The controller 140 further includes a machine learning module 360 and a real-time image identification module 370. With reference to FIG. 3 and FIG. 4 together, in step S410, the switching module 310 of the controller obtains the user distance (e.g., the distance D1 in FIG. 2) between the user 150 and the transparent display 110 through one of the identification sensors (e.g., the first identification sensor 122). From another aspect, in order to obtain a number and a position of the at least one user 150, the switching module 310 in the transparent display device 100 determines the number of the user 150 through a specific identification sensor (e.g., the first identification sensor 122) having the greatest identifying distance among the identification sensors. Since the first identification sensor 122 may be implemented as the depth sensor, the switching module 310 may further obtain the user distance corresponding to the user 150 between the user 150 and the transparent display 110. If the no user is detected by the first identification sensor 122, the first identification sensor 122 continues to detect. If a number of users are detected by the first identification sensor 122, the first identification sensor 122 detects the corresponding user distance D1 to each of the users.

In step S420, the switching module 310 selects corresponding identification data generated by at least one of or multiple of the identification sensors according to the user distance D1. In the embodiments, the switching module 310 selects one of a plurality of sensing modes according to the user distance D1, and each of the sensing modules corresponds to at least one or two identification sensors. Moreover, the switching module 310 obtains the corresponding identification data selected by controlling the corresponding at least one of or multiple of the identification sensors according to the selected sensing mode. In other words, the switching module 310 selects corresponding identification data generated by at least one of or multiple of the identification sensors according to the user distance D1, the distance D2 between the transparent display 110 and the target object 220, and a touch sensing result of the third identification sensor 126 (the touch sensor). Table 1 is taken as an example in this embodiment to illustrate relationships among the sensing modes, the first to the third identification sensors 122, 124, and 126, and the user distance D1. The distance D2 in table 1 is the distance between the transparent display 110 and the target object 220.

| Sensing Modes | Identification Sensors | | Selection of Identification Data |
|---|---|---|---|
| | Depth Sensors (First Identification Sensor) | Touch Sensors (Third Identification Sensor) | |
| A | D1 > D2 | touch sensing undetected | IS1 of depth sensor (first identification sensor) |
| B | D1 < D2 | touch sensing undetected | IS2 of face sensor (second identification sensor) |
| C | D1 > D2 | touch sensing detected | IS1 of the depth sensor and IS3 of the touch sensor (first and third identification sensors) |
| D | D1 < D2 | touch sensing detected | IS2 of face sensor and IS3 of touch sensor (second and third identification sensors) |

None of the sensing mode A and the sensing mode B in Table 1 have detected with touch sensing in the identification data IS3 generated by the third identification sensor 126. When the user distance D1 is greater than the predetermined distance D2, since the identifying distance of the first identification sensor (the depth sensor) is greater than the identifying distance of the second identification sensor (the face sensor), the switching module 310 selects the sensing mode A and controls the corresponding first identification sensor 122 to obtain the selected corresponding identification data IS1 according to the selected sensing mode A. In another aspect, when the user distance D1 is less than the predetermined distance D2, the switching module 310 selects the sensing mode B and controls the corresponding second identification sensor 124 to obtain the selected corresponding identification data IS2 according to the selected sensing mode B.

The sensing mode C and the sensing mode D in Table 1 have detected with touch sensing in the identification data IS3 generated by the third identification sensor 126. Therefore, when the user distance D1 is greater than the predetermined distance D2, the switching module 310 selects the sensing mode C and controls the corresponding first identification sensor 122 and the third identification sensor 126 to obtain the corresponding identification data IS1 and the selected corresponding identification data IS3 according to the selected sensing mode C. In another aspect, when the user distance D1 is less than the predetermined distance D2, the switching module 310 selects the sensing mode D and controls the corresponding second identification sensor 124 and the third identification sensor 126 to obtain the corresponding identification data IS2 and the selected corresponding identification data IS3 according to the selected sensing mode D.

For another point of view, the switching module 310 of the controller 140 in the embodiments may compare the identifying distance of each identification sensor with the user distance D1, and select corresponding identification data generated by the identification sensor which identifying distance thereof is greater than or equal to the user distance D1. The selected corresponding identification data is served as a basis for determining a location and a gaze direction of the users and the target object 220 in the scene information. For example, it is assumed that the first identification sensor 122 is the depth sensor, and its identifying distance is approximately between 50 cm and 100 cm; assuming that the second identification sensor 124 is the face sensor, and its identifying distance is approximately between 40 cm and 60 cm; assuming that the third identification sensor 126 is the touch sensor, and its identifying distance is approximately between 0 cm and 40 cm. When the user distance D1 is 30 cm, since the identifying distances of the first to the third identification sensors 122, 124, 126 are all greater than the user distance D1, the switching module 310 can select one of the identification data IS1, IS2, IS3 of the first to the third identification sensors 122, 124, 126 as the selected corresponding identification data. When the user distance D1 is 50 cm, since the identifying distances of the first and the second identification sensors 122 and 124 are all greater than or equal to the user distance D1, the switching module 310 can select one of the identification data IS1, IS2 of the first and the second identification sensors 122 and 124 as the selected corresponding identification data. When the user distance D1 is 70 cm, since the identifying distance of the first identification sensor 122 is greater than or equal to the user distance D1, the switching module 310 selects the identification data IS1 of the first identification sensor 122 as the selected corresponding identification data.

In step S430, the controller 140 determines the location and the gaze direction of the user 150 and the target object in the scene information sensed by the scene sensor 130 according to the selected corresponding identification data in step S420. The coordinate transformation module 320 may transform coordinates (Xt, Yt) of a touch point 210 illustrated in FIG. 2 through the selected corresponding identification data, such that the coordinates are located in a global coordinate system featuring the transparent display device 100 and may be used by other modules. In this embodiment, the transformation of the coordinates may also be learned by using the machine learning module 360 and a machine learning database thereof, so as to facilitate a coordinate transformation speed. The scene capturing module 340 obtains the scene information 160 through the external scene information ISE.

The sensing mode A to the sensing mode D of this embodiment respectively corresponds to different algorithms. The algorithms calculate the location and the gaze direction of the user 150 and the target object in the scene information according to the operation of the controller 140. The line-of-sight analysis and calculation module 330 calculates and determines the location and the gaze direction V1 of the user 150 and the target object 220 in the scene information 160 sensed by the scene sensor 130 according to the algorithms and the coordinate information provided by the coordinate transformation module 320.

In some embodiments of the disclosure, which corresponding algorithm (may also be referred to as a user line-of-sight analysis algorithm) in the sensing mode A to the sensing mode D produces the better result may be determined through a precision selector 380 in the controller 140 of FIG. 3. With reference to the schematic views of FIG. 2 and FIG. 3, the precision selector 380 in the controller 140 calculates a first angle θ1 of a connection line connecting the first gaze point (e.g., the first gaze point 210 of FIG. 2) formed by the gaze direction V1 on the transparent display 110 and the target object 220 based on the identification data (e.g., the identification data IS1, the identification data IS2, and the identification data IS3) generated by at least one of or multiple of the identification sensors corresponding to each of the sensing modes (e.g., the sensing mode A to the sensing mode D). Moreover, the precision selector 380 in the controller 140 also calculates the gaze direction V1 of the user and a second angle θ2.

The first angle θ1 may be obtained by calculating the second angle θ2, the distance D1, and the distance D2, as shown by the following formula (1):

$$\theta 1 = \tan^{-1}\left(\tan\theta 2 \times \frac{D1 + D2}{D1}\right) \quad (1)$$

The precision selector 380 in the controller 140 further calculates a difference value between the first angle θ1 and the second angle θ2. The precision selector 380 in the controller 140 then selects from one of the sensing modes according to the difference value corresponding to each of the sensing modes. For instance, if the difference value between the two angles is considerably close to zero, it indicates that the algorithm corresponding to such sensing mode may obtain the most precise location and the gaze direction V1 of the user 150 as well as the target object 220 in the scene information 160. The precision selector 380 in the controller 140 thereby controls the switching module 310 to select and adopt the sensing mode corresponding to the difference value close to zero when the difference value is close to zero. The controller 140 of this disclosure may selectively adopt the precision selector 380 to enhance the selection of the sensing modes. In other words, the controller 140 of the embodiments of the disclosure may and may not adopt the precision selector 380.

With reference to FIG. 4 again, in step S440, the information and real-view integration module 350 in the controller 140 retrieves a corresponding identifying database according to the target object 220 to search the target object information corresponding to the target object 220. Moreover, the information and real-view integration module 350 generates display information according to the coordinates of the user, the first gaze point 210 and the target object information corresponding to the target object 220, wherein the coordinates of the user, the first gaze point 210 and the target object information are obtained through calculation according to the line-of-sight analysis and calculation module 330 in the controller 140. An image database is provided in the real-time image identification module 370 and may facilitate the information and real-view integration module 350 to identify each of the target objects in the scene information 160 and to calculate the coordinates of each of the target objects for positioning the target objects. In step S450, the transparent display 110 presents the target object information corresponding to the target object 220 according to the display information.

Figure 5:
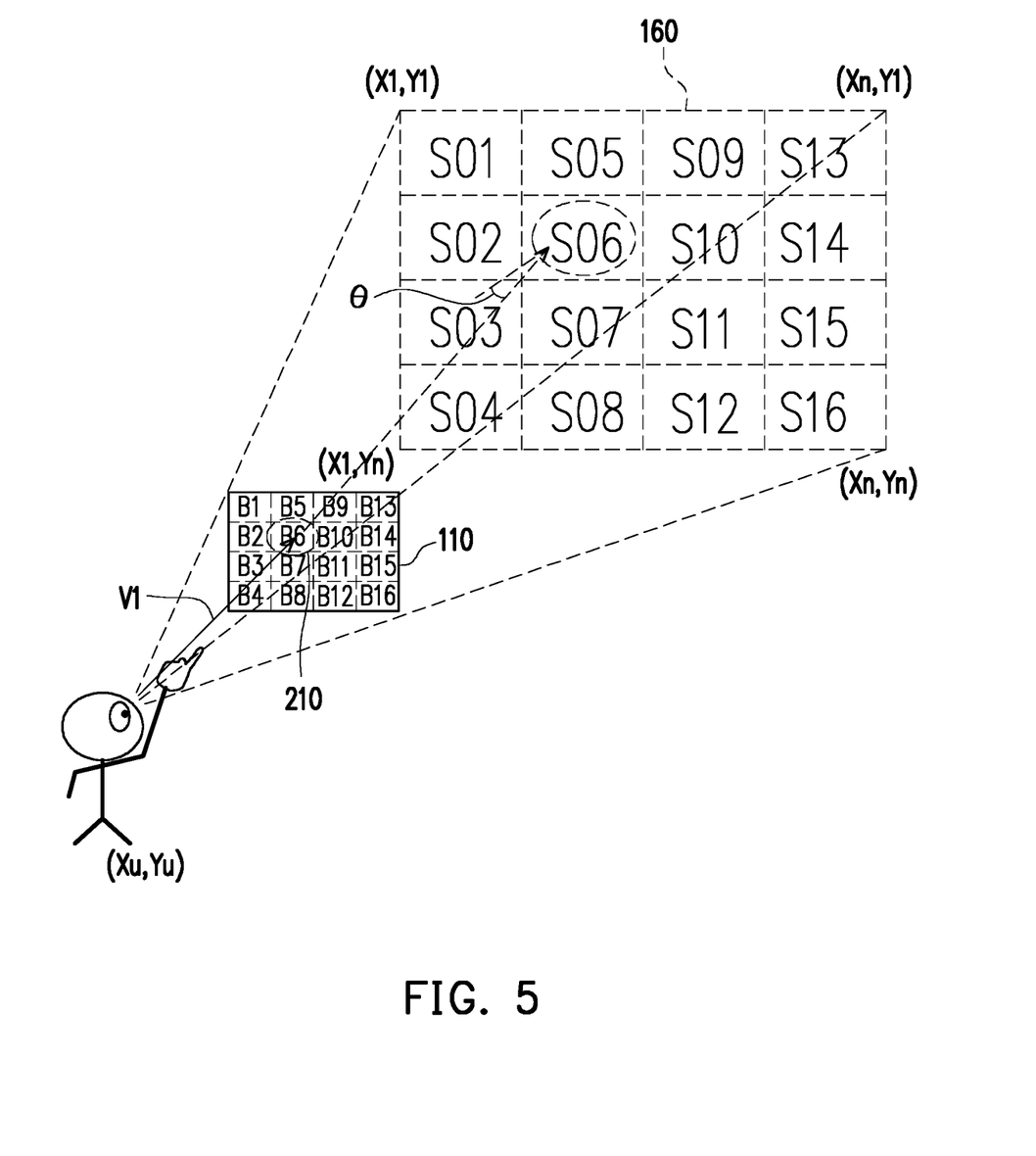
FIG. 5 is a schematic diagram describing algorithms adopted by the sensing mode A and the sensing mode B in Table 1.
Figure 6:
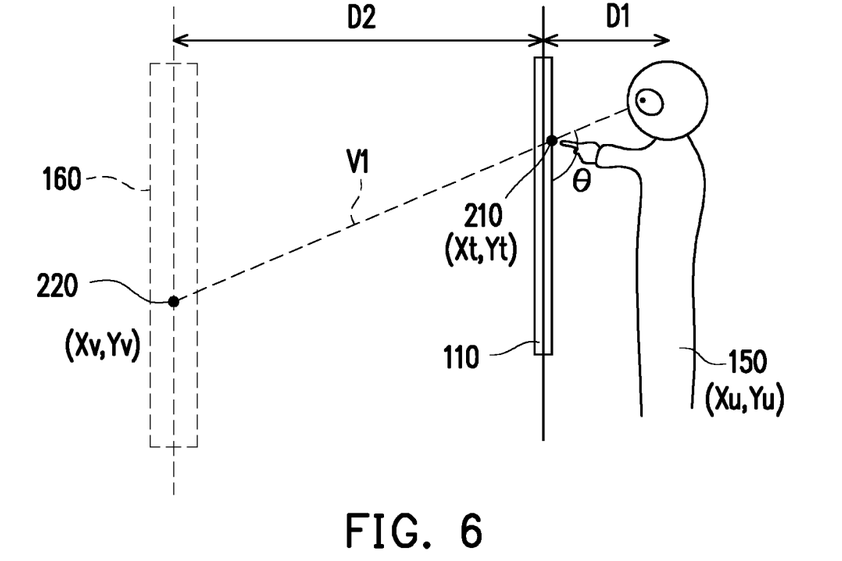
FIG. 6 and FIG. 7 are schematic diagrams describing algorithms adopted by the sensing mode C and the sensing mode D in Table 1.
Figure 7:
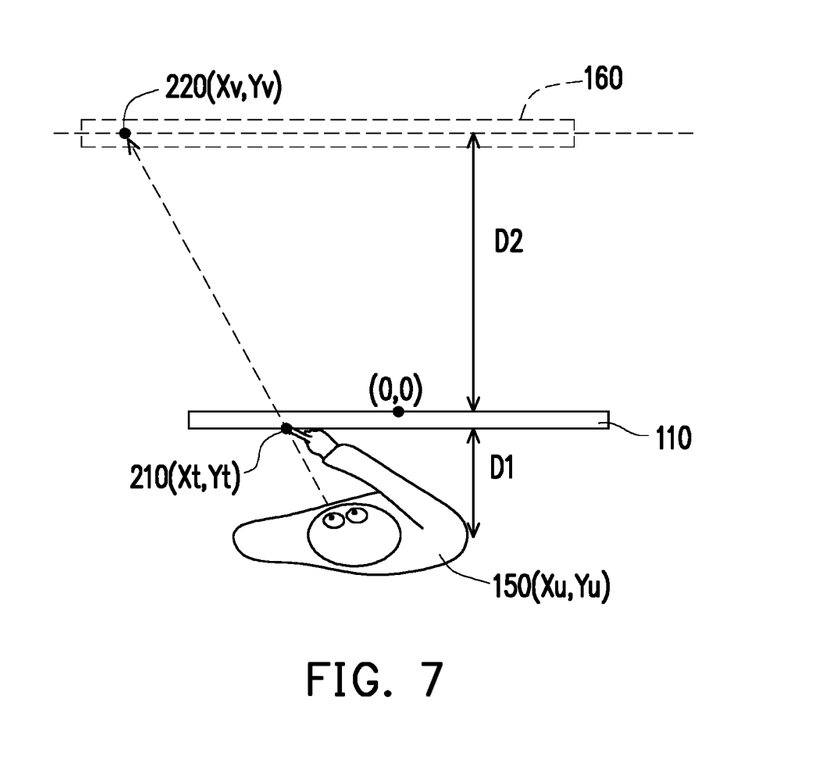

With reference to description in FIG. 5 to FIG. 7, the line-of-sight analysis and calculation module 330 of this embodiment may adopt at least two algorithms to calculate the position and the gaze direction V1 of the user 150 and the target object 220. The embodiment may also be applied by adopting other algorithms in line with the corresponding sensing module and the identification sensor, so as to obtain improved image effect. FIG. 5 is a schematic diagram describing algorithms adopted by the sensing mode A and the sensing mode B in Table 1. In the algorithms shown in FIG. 5, the line-of-sight analysis and calculation module 330 of the controller 140 divides the scene information 160 and the display screen of the transparent display 110 into multiple blocks (e.g., block S01 to block S16 in the scene information 160 and the block B1 to block 16 of the display screen). The block B1 to block B16 located on the display screen may respectively be projected onto the corresponding block S01 to block S16 of the scene information 160. The corresponding block S01 to block S16 of the scene information 160 may also be set through predetermined coordinates. The coordinates are, for example, coordinates (X1, Y1), (X1, Yn), (Xn, Y1), and (Xn, Yn) marked in the four corners of the scene information 160 in FIG. 5. After the line-of-sight analysis and calculation module 330 calculates the coordinates (Xu, Yu) of the user 150, the distance D1, the gaze direction V1, and a vector angle θ (e.g., (θx, θy)), a coordinate transformation matrix between the user position and the touch point (or the first gaze point 210) may be formed through the foregoing projection relations between the blocks, and that the coordinates of the target object are obtained through the coordinate transformation matrix. If the identification data IS3 may be obtained from the third identification sensor 126 (the touch sensor), the touch point generated by the user 150 may substitute the first gaze point 210, and the touch point may also be used to calculate a more precise gaze direction V1 and the vector angle θ (e.g., (θx, θy)) thereof.

FIG. 6 and FIG. 7 are schematic diagrams describing algorithms adopted by the sensing mode C and the sensing mode D in Table 1. FIG. 6 is a schematic diagram looking from a lateral side of the user 150, and FIG. 7 is a schematic diagram looking down from the top of the head of the user 150. The algorithm is based on the touch point 210 obtained through touch sensing to simply calculate the coordinates of the target object 220 and the angle of the gaze direction V1. First, a ratio of the distance D2 to the distance D1 is calculated to be N:1. The coordinates (Xv, Yv) of the target object 220 may then be obtained by calculating the coordinates (Xt, Yt) of the first gaze point 210 (or also referred to as the touch point) and the ratio of the distance D2 to the distance D1, as shown by formula (2):

$$(Xv, Yv) = (N + 1)(Xt, Yt) \qquad (2)$$
$$= (N + 1)(Xu + D1 \times \tan\theta x, Yu + D1 \times \tan\theta y)$$

The angle θ is an included angle between the gaze direction V1 and the transparent display screen in the transparent display 110.

The angle θ (θx, θy) may also be obtained through calculating the coordinates of the user 150, the coordinates of the first gaze point 210, and the distance D1, as shown by formula (3):

$$\theta x = \tan^{-1}\left(\frac{Xt - Xu}{D1}\right); \theta y = \tan^{-1}\left(\frac{Yt - Yu}{D1}\right) \qquad (3)$$

Figure 8:
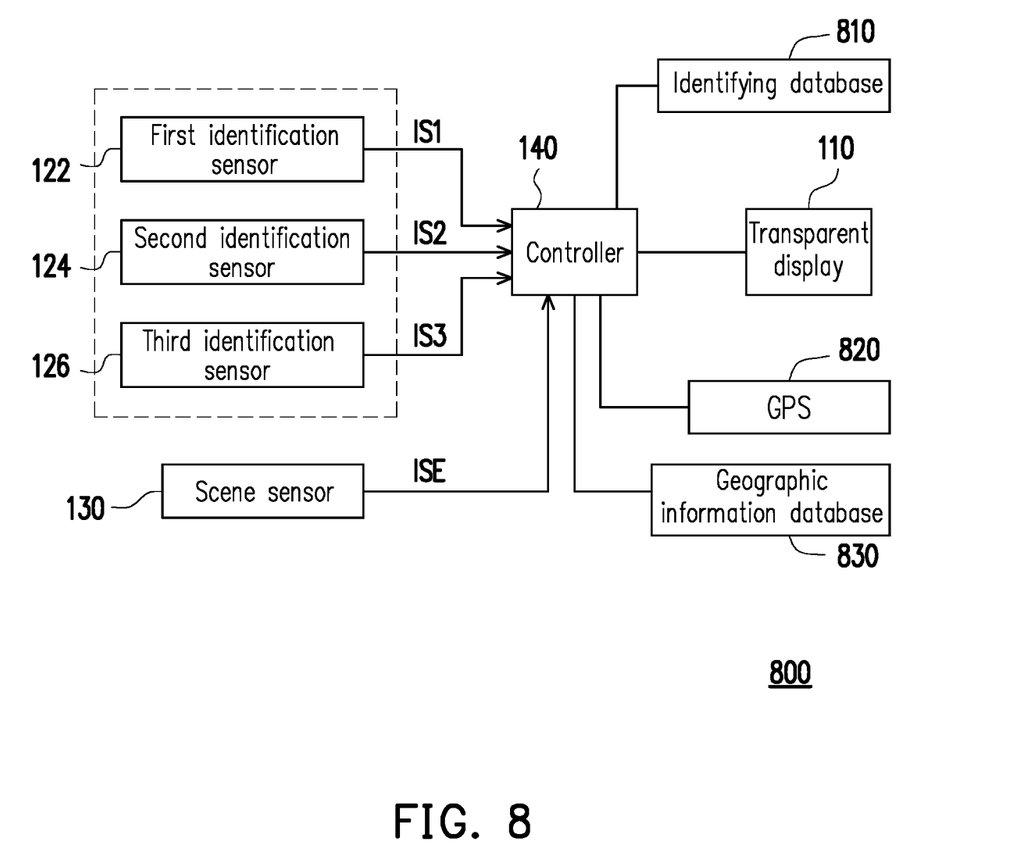
FIG. 8 is a block view of functions of a transparent display device according to another exemplary embodiment of the disclosure.

FIG. 8 is a block view of functions of a transparent display device 800 according to another exemplary embodiment of the disclosure. In addition to the elements of FIG. 1, the transparent display device 800 further includes an identifying database 810, a global positioning system device (GPS) 820, and a geographic information database 830. The identifying database 810 may be coupled to the controller 140 of FIG. 1. Content of the identifying database 810 of this embodiment is adjusted based on different scene information, and thus the target object information is presented from databases of various areas. For instance, related information on buildings is added to the content of the identifying database 810 when a majority of the scene information refers to buildings; related information on marine life, ocean current, etc. is added to the content of the identifying database 810 when a majority of the scene information refers to marine life; related information on names, origins, related history of cultural relics is added to the content of the identifying database 810 when a majority of the scene information refers to the cultural relics; the scene information around the transparent display device 800 acts as a fixed field information, and the fixed field information is added to the content of the identifying database 810 when the transparent display device 800 is fixed at a specific position and the transparent display device 800 detects that the external scene information does not change randomly.

The global positioning system device (GPS) 820 and the geographic information database 830 are both coupled to the controller 140. The controller 140 positions the user and the target object according to the global positioning system device 820. In addition, the controller 140 searches the geographic information database 830 to obtain the target object information corresponding to the target object according to the user and a positioning result of the target object. For instance, when the transparent display device 800 is installed on a transportation vehicle such as a tour bus, a cable car, or a boat, the global positioning system device 820 may instantly and dynamically position the location of the user, such that the transparent display device may learn about the scene around and related information.

In view of the foregoing, in the transparent display device of the embodiments of the disclosure, the scene object actually seen by the user is detected and determined by selectively mixing and using multiple identification technologies (e.g., human eye tracking, touch sensing, image identification, etc.) by using the user distance detected. The corresponding line-of-sight analysis algorithm based on the different combinations of the identification sensing technologies (e.g., the sensing mode) may be used to analyze the line of sight of the user and the target object gazed by the user, so as to improve identification correctness of the transparent display device for the user. In addition, in the embodiments of the disclosure, the databases and/or the global positioning technologies of different areas may be used, such that, the real-time image identification and transformation between the line of sight and the touch sensing coordinates may be more precise.

It will be apparent to those skilled in the art that various modifications and variations can be made to the disclosed embodiments. It is intended that the specification and examples be considered as exemplary only, with a true scope of the disclosure being indicated by the following claims and their equivalents.

The invention claimed is:

1. A transparent display device, comprising:
   a transparent display, comprising a first side and a second side opposite to the first side, a display screen of the transparent display is visually penetrative;
   a plurality of identification sensors, configure to sense at least one user located at the first side to respectively generate a plurality of identification data, wherein the identification sensors respectively have different identifying distances;
   a touch sensor, coupled to the first side of the transparent display, configure to sense the at least one user located at the first side to respectively generate a touch identification data;
   a scene sensor, configure to sense scene information located at the second side; and
   a controller, coupled to the identification sensors, the scene sensor, and the transparent display, the controller obtains a user distance between the at least one user and the transparent display by controlling one of the identification sensors, selects corresponding identification data generated by at least one of the plurality of identification sensors according to the user distance, determines a location and a gaze direction of the at least one user and a target object in the scene information according to the selected corresponding identification data and a touch point determined by the touch identification data, divides the scene information into a plurality of scene blocks, and divides the display screen of the transparent display into a plurality of screen blocks, wherein the screen blocks located on the display screen is respectively projected onto the scene blocks of the scene information, forms a coordinate transformation matrix between the location of the user and the touch point through a projection relation between the screen blocks and the scene blocks, and obtains coordinates of the target object in the scene information through the coordinate transformation matrix, generates a display information according to coordinates of the user and a first gaze point and target object information corresponding to the target object, and presents the target object information corresponding to the target object in the transparent display according to the display information, wherein the first gaze point is the touch point determined by the touch identification data.

2. The transparent display device as claimed in claim 1, wherein the controller selects the corresponding identification data generated by the identification sensors which the identifying distance thereof is greater than or equal to the user distance, and determines the location and the gaze direction of the users and the target object in the scene information according to the selected corresponding identification data.

3. The transparent display device as claimed in claim 1, wherein the identification sensors at least comprise a depth sensor and a face sensor, wherein an identifying distance of the depth sensor is greater than an identifying distance of the face sensor.

4. The transparent display device as claimed in claim 3, wherein the controller selects the corresponding identification data generated by the at least one of the identification sensors according to the user distance, a distance between the transparent display and the target object, and a touch sensing result of the touch sensor.

5. The transparent display device as claimed in claim 1, further comprising:

an identifying database, coupled to the controller, the controller searches the target object information corresponding to the target object according to the identifying database.

6. The transparent display device as claimed in claim 1, further comprising:

a global positioning system device, coupled to the controller, wherein the controller positions the at least one user and the target object according to the global positioning system device; and a geographic information database, coupled to the controller, wherein the controller searches the geographic information database to obtain the target object information corresponding to the target object according to the at least one user and a positioning result of the target object.

7. The transparent display device as claimed in claim 1, wherein the controller determines a number of the at least one user by controlling a specific identification sensor having a greatest identifying distance among the identification sensors and obtains the user distance corresponding to the at least one user between the at least one user and the transparent display.

8. The transparent display device as claimed in claim 1, wherein the controller selects one of a plurality of sensing modes according to the user distance, wherein each of the sensing modes corresponds to at least one of or multiple of the identification sensors, and the controller obtains the corresponding identification data selected by controlling the corresponding at least one of or multiple of the identification sensors according to the selected sensing mode.

9. The transparent display device as claimed in claim 8, wherein each of the sensing modes respectively corresponds to different algorithms, and the algorithms are configured to calculate the location and the gaze direction of the at least one user and the target object in the scene information through execution of the controller.

10. A control method using a transparent display device, the transparent display device comprising a transparent display, a plurality of identification sensors, a touch sensor, and a scene sensor, wherein the control method comprising:

obtaining a user distance between a user and the transparent display through one of the identification sensors;

selecting corresponding identification data generated by at least one of the plurality of identification sensors according to the user distance;

determining a location and a gaze direction of the user and a target object in a scene information sensed by the scene sensor according to the selected corresponding identification data and a touch point determined by a touch identification data generated by the touch sensor;

dividing the scene information into a plurality of scene blocks, and dividing a display screen of the transparent display into a plurality of screen blocks, wherein the screen blocks located on the display screen is respectively projected onto the scene blocks of the scene information;

forming a coordinate transformation matrix between the location of the user and the touch point through a projection relation between the screen blocks and the scene blocks, and obtaining coordinates of the target object in the scene information through the coordinate transformation matrix;

generating a display information according to coordinates of the user and a first gaze point and target object information corresponding to the target object; and presenting the target object information corresponding to the target object in the transparent display according to the display information, wherein the first gaze point is the touch point determined by the touch identification data.

11. The control method as claimed in claim 10, wherein selecting the corresponding identification data generated by the at least one of the identification sensors according to the user distance comprising:

selecting the corresponding identification data generated by the identification sensors which an identifying distance thereof is greater than or equal to the user distance.

12. The control method as claimed in claim 10, wherein the identification sensors at least comprise a depth sensor and a face sensor,
   wherein an identifying distance of the depth sensor is greater than an identifying distance of the face sensor.

13. The control method as claimed in claim 12, wherein selecting the corresponding identification data generated by the at least one of the identification sensors according to the user distance comprising:
   selecting the corresponding identification data generated by the at least one of the identification sensors according to the user distance, a distance between the transparent display device and the target object, and a touch sensing result of the touch sensor.

14. The control method as claimed in claim 10, further comprising:
   searching the target object information corresponding to the target object according to an identifying database.

15. The control method as claimed in claim 10, further comprising:
   searching a geographic information database to obtain the target object information corresponding to the target object according to the user and a positioning result of the target object.

16. The control method as claimed in claim 10, wherein obtaining the user distance between the user and the transparent display through one of the identification sensors comprising:
   determining a number of the user through a specific identification sensor with the greatest identifying distance among the sensors; and
   obtaining the user distance corresponding to the user between the user and the transparent display device.

17. The control method as claimed in claim 10, wherein selecting the corresponding identification data generated by at least one of or multiple of the identification sensors according to the user distance comprising:
   selecting one of a plurality of sensing modes according to the user distance, wherein each of the sensing modes corresponds to at least one of or multiple of the identification sensors; and
   obtaining the corresponding identification data selected by controlling the corresponding at least one of or multiple of the identification sensors according to the selected sensing mode.

18. The control method as claimed in claim 17, wherein each of the sensing modes respectively corresponds to different algorithms, and the algorithms are configured to calculate the location and the gaze direction of the user and the target object in the scene information through execution of the controller.

* * * * *